United States Patent [19]

Scheer

[11] 4,424,712

[45] Jan. 10, 1984

[54] WHEEL DECELERATION SENSOR

[75] Inventor: Lawrence E. Scheer, Phoenix, Ariz.

[73] Assignee: The United States of America as represented by the Secretary of the Army, Washington, D.C.

[21] Appl. No.: 330,056

[22] Filed: Dec. 14, 1981

[51] Int. Cl.³ .............................................. G01P 15/03
[52] U.S. Cl. ...................................................... 73/514
[58] Field of Search ....................... 73/514, 515, 516 R, 73/517 A; 188/181 A

[56] References Cited
U.S. PATENT DOCUMENTS 2,766,853 10/1956 Travaskis et al. ..................... 73/514
2,805,849 9/1957 Chillson ................................ 73/511
4,055,090 10/1977 Fuchs ................................ 73/517 A

FOREIGN PATENT DOCUMENTS 360099 9/1922 Fed. Rep. of Germany ........ 73/514

Primary Examiner—James J. Gill
Attorney, Agent, or Firm—Robert P. Gibson; Peter A. Taucher; John E. McRae

[57] ABSTRACT

In an anti-skid braking system, an improved sensor responsive to forces associated with deceleration of the vehicle road wheel. The sensor comprises a housing driven at a speed related to road wheel speed; an annular inertia mass is connected to the rotary housing via a multi-convolution hair spring wound to bias the inertia mass against the direction of housing rotation. Deceleration of the housing causes the inertia mass to angularly advance relative to the housing. A cam-follower mechanism translates the angular advance into linear motion of an output stem member located on the housing rotational axis. Stem member movement can be used to effect pulse control of the anti-skid braking system.

4 Claims, 2 Drawing Figures

WHEEL DECELERATION SENSOR

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to an improved sensor for measuring deceleration of a road wheel on a vehicle. The sensor is especially useful in a control mechanism for a vehicle anti-skid brake system.

In some anti-skid brake systems braking torque is applied until vehicle deceleration exceeds a predetermined threshold, at which point the braking force is automatically removed or lessened; the deceleration threshold is selected to prevent wheel lock-up and incipient skid condition. When the deceleration rate is sufficiently lessened below the skid threshold level the braking force is reapplied. Overall braking action is a cyclic pulse type application of the brake force at frequencies greater than five or ten braking pulses per second. The system requires a control system that includes a road wheel deceleration sensor having a relatively quick response to the parameter being sensed. The present invention is directed to a sensor having the required quick response.

The preferred sensor is designed to respond to wheel deceleration rather than absolute wheel speed. It has been determined that braking is most effective at the point where the rate of change of deceleration is zero. At this point the rate of change of the coefficient of friction of the tire on the road is a maximum so that braking then has its greatest effectiveness. An effective braking system can be designed around a wheel sensor responsive to wheel deceleration rather than wheel speed. The system envisioned by applicant includes a fluidic amplifier and control system wherein sensed values of deceleration are fluidically differentiated to obtain the rate of change of deceleration. The resulting signal and a second signal representing the desired limit on rate of change of the deceleration signal are applied to a fluidic oscillator to provide an amplified control signal for the brake pressure. As previously noted, the present invention relates to an improved sensor responsive to road wheel deceleration forces.

THE DRAWINGS

Figure 1:
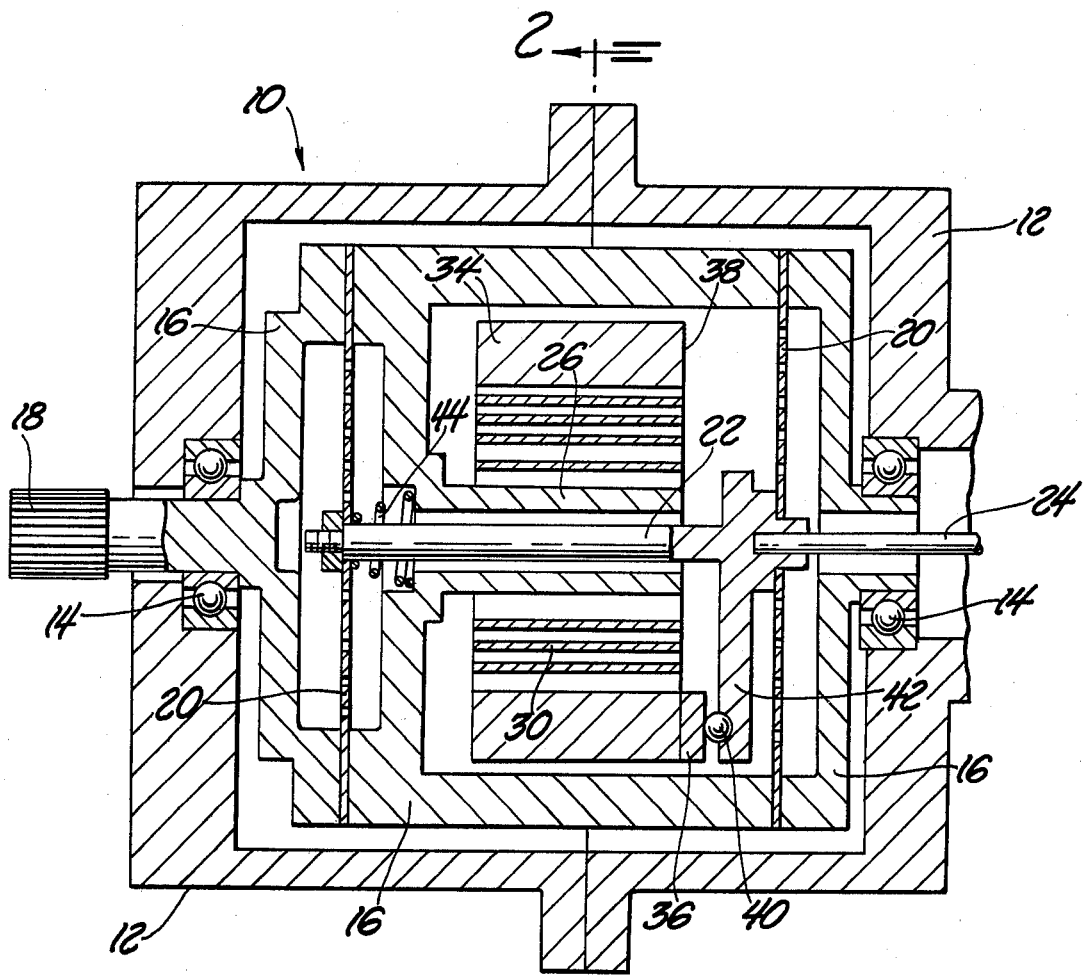
FIG. 1 is a sectional view taken through a sensor embodying this invention.

Referring in greater detail to the drawings, there is shown a sensor 10 that includes a support structure 12 adapted to be affixed to the mount system for a vehicle road wheel, not shown; structure 12 includes two axially spaced bearings 14 that collectively carry a circular rotary housing 16. Housing 16 includes at its left end a gear 18 adapted to mesh with a nonillustrated gear, chain, etc., driven by the road wheel, whereby housing 16 is driven at a speed directly related to road wheel speed.

Disposed within housing 16 are two archimedes springs 20 that collectively support an output stem member 22 for linear motion along the rotational axis of housing 16; each spring 20 is a thin flexible metal sheet having a spiral slot therein for enabling the central area of the sheet to shift in an axial direction with a relatively low force input. Stem 22 operates a pin 24 adapted to extend into and across the power jet of a nonillustrated fluidic amplifier to control the amplifier output signal. Axial motion of stem member 22 produces the control action.

Figure 2:
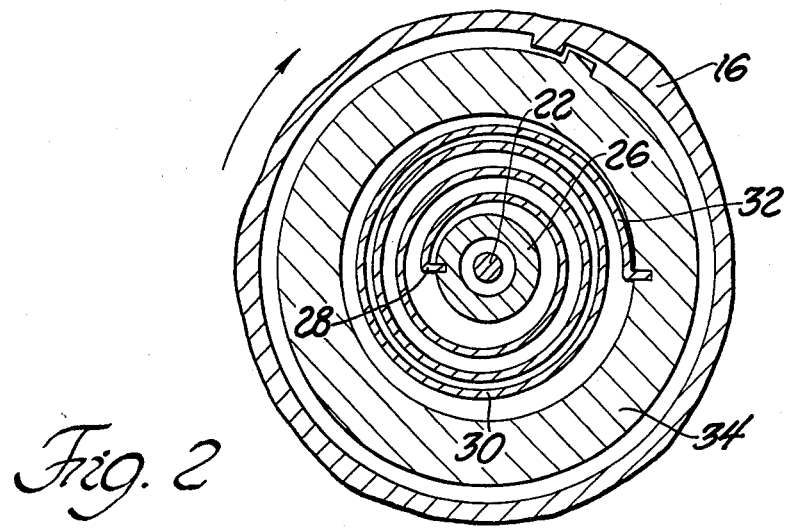
FIG. 2 is a sectional view on line 2—2 in FIG. 1.

Housing 16 includes a hollow post 26 surrounding stem 22 without direct contact therebetween. As best seen in FIG. 2, post 26 acts as an anchorage for the inner end 28 of a multi-convolution hair spring 30. The spring spirals outwardly, with its extreme outer end 32 anchored to the inner surface of an annular inertia mass or weight 34. Spring 30 has its adjacent convolutions out of direct contact with each other to eliminate frictional effects between post 22 and mass 34. The axial length of hair spring 30 is preferably larger than the radial spacing between post 26 and inertia mass 34; the aim is to provide a stiff connection that resists tilt of mass 34 from its illustrated orientation parallel to post 26. Spring 30 is wound to exert a resilient force tending to move mass 34 opposite to the direction of housing 16 rotation.

When gear 18 is operated by the road wheel to rotate housing 16 at a constant speed the inertia mass 34 is in an angularly retarded position as shown in FIG. 2. However during the application of a braking force to the road wheel housing 16 is decelerated. Mass 34 tends to angularly advance relative to housing 16. The angular advance is resisted by spring 30.

A cam-cam follower mechanism is operatively located between mass 34 and output member 22 for translating angular advance of mass 34 into axial movement of member 22. The cam-cam follower mechanism preferably includes a cam 36 extending along end surface 38 of mass 34 in concentric relation to the housing 16 rotational axis. A follower ball 40 is carried on an arm 42 that extend radially from stem 22. The axial thickness of cam 36 is different at different points along the cam length, so that advance motion of mass 34 causes ball 40 and arm 42 to shift in an axial direction. A light compression spring 44 acts on stem 22 to maintain ball 40 in continuous engagement with cam 36. Angular advance of inertia mass 34 produces an abrupt axial motion of stem 22 that causes the associated stem 24 to extend into the power jet of a nonillustrated fluidic amplifier forming part of a control system for the brake fluid pressure. Axial motion of stem 22 thus results in a release of the braking force from the road wheel. The resultant lack of braking force (or lessened brake force) enables spring 30 to return inertia mass 34 to its initial position. Stem 22 shifts axially back to its initial position permitting reapplication of braking pressure to the road wheel. Stem 22 provides the control, not the brute force.

Angular advance of mass 34, sufficient to produce a control action on the brake fluid pressure, preferably takes place within a few milliseconds in order that the brake system can achieve a brake application pulse frequency of at least five or ten cycles per second. The structural makeup of the sensor is believed to contribute to the necessary quick sensor time response to road wheel deceleration events. Preferably housing 16 is driven at a greater speed than the road wheel, e.g., ten times road wheel speed; to this end the small gear 18 is engaged with a larger gear, not shown, carried by or driven by the road wheel. Housing 16 speeds in the neighborhood of 6000 r.p.m. are contemplated.

Cam 36 can extend for a relatively large arcuate distance around the housing rotational axis, e.g., one hundred eighty degrees, whereby the slope of the cam surface can be relatively small to achieve desired sensitivity of response. Archimedes springs 20 rigidify stem 22 in radial directions without introducing frictional effects that would impede axial motion of the stem.

I wish it to be understood that I do not desire to be limited to the exact details of construction shown and described for obvious modifications will occur to a person skilled in the art.

I claim:

1. In a wheel deceleration control mechanism for a vehicle skid control brake system, an improved sensor for measuring road wheel deceleration; said improved sensor comprising a circular housing (16) driven at a speed related to road wheel speed; an axially shiftable output member located within the housing, said output member comprising a stem on the housing rotational axis; means for suspending the stem out of direct contact with the housing surface, said suspending means comprising two archimedes springs trained between the housing and stem at axially spaced points along the stem length for accommodating axial motion of the stem while preventing relative rotation between the stem and housing; an annular inertia mass (34) disposed within the housing out of direct contact with the housing surface; a suspension spring (30) trained between the housing and the inertia mass to exert a resilient force tending to rotate the inertia mass against the direction of housing rotation, whereby angular deceleration of the housing enables the inertia mass to advance angularly relative to the housing, and angular acceleration of the housing enables the suspension spring to angularly retard the inertia mass relative to the housing; amd cam-cam follower means between the inertia mass and output member for translating advance or retard action of the inertia mass into axial motions of the output member.

2. The improvement of claim 1 wherein the housing includes a hollow post surrounding the stem without direct contact therebetween; the aforementioned suspension spring being an outwardly spiralling multi-convolution hair spring having one of its ends anchored to the post and its other end anchored to the inertia mass.

3. The improvement of claim 2 wherein the axial length of the hair spring is relatively large compared to the radial spacing between the post and the inertia mass.

4. The improvement of claim 3 wherein the aforementioned cam-cam follower means comprises an arcuately elongated cam extending along an end surface of the inertia mass in concentric relation to the housing rotational axis, an arm extending radially from the aforementioned stem, and a ball carried by the arm in rolling contact with the cam; the cam having a varying axial dimension along its length to translate rotary motion of the inertia mass into axial movement of the ball, arm and stem.

* * * * *